Sept. 24, 1963 S. T. GLOVER 3,104,949
PROCESS FOR THE PRODUCTION OF CAUSTIC ALKALI SOLUTIONS FROM
ALKALI METAL AMALGAMS AND TO APPARATUS THEREFOR
Filed Sept. 13, 1962 3 Sheets-Sheet 1

Fig. 1.

INVENTOR.
THOMAS SIDNEY GLOVER
BY
Cushman, Darby & Cushman
ATTORNEYS

Sept. 24, 1963 S. T. GLOVER 3,104,949
PROCESS FOR THE PRODUCTION OF CAUSTIC ALKALI SOLUTIONS FROM
ALKALI METAL AMALGAMS AND TO APPARATUS THEREFOR
Filed Sept. 13, 1962 3 Sheets-Sheet 3

Fig.3.

INVENTOR.
THOMAS SIDNEY GLOVER
BY
Cushman, Darby & Cushman
ATTORNEYS

United States Patent Office 3,104,949
Patented Sept. 24, 1963

3,104,949
PROCESS FOR THE PRODUCTION OF CAUSTIC ALKALI SOLUTIONS FROM ALKALI METAL AMALGAMS AND TO APPARATUS THEREFOR
Sidney Thomas Glover, Runcorn, England, assignor to Imperial Chemical Industries Limited, London, England, a corporation of Great Britain
Filed Sept. 13, 1962, Ser. No. 223,422
Claims priority, application Great Britain Jan. 15, 1958
28 Claims. (Cl. 23—184)

The present invention relates to improvements in or relating to a process for the production of caustic alkali solutions from alkali metal amalgams and to apparatus therefor and is particularly concerned with a process which is adapted for the continuous production of caustic alkali solutions of high concentrations from alkali metal amalgams and apparatus therefor.

In processes for the production of caustic soda by reacting with an aqueous medium in the presence of an alkali metal amalgam decomposition material, as for example graphite, the sodium amalgam which is formed on the electrolysis of brine in mercury cells, it is well known that either the aqueous medium can be the continuous phase and the amalgam the dispersed phase or the amalgam can be the continuous phase and the aqueous medium the dispersed phase and for the carrying out of these processes various forms of amalgam decomposers or denuders, as for instance, of the graphite packed tower type, have been proposed. For instance, the so-called De Nora tower decomposers or denuders may consist of carbon steel towers which are packed with ¾" graphite lumps and are flooded with an aqueous phase moving counter currently to a dispersed amalgam phase. With such denuders in a single stage process only one unheated column is employed and 50% caustic liquor is produced but in a two-stage process two columns one above the other are used wherein the lower column is steam jacketed and caustic soda at concentrations up to 73% can be produced.

On the other hand, in the Mathieson type tower decomposers or denuders a graphite-packed tower is flooded with amalgam and the aqueous medium dispersed through the amalgam by employing either co-current or counter-current flow of the two liquids. In the preferred method with this type of decomposer or denuder it would seem that strong amalgam enters at the top of the column and flows downwards counter-current to the rising aqueous medium which is dispersed in the amalgam and to the rising hydrogen resulting from the decomposition of the amalgam.

It is held that since amalgam decomposition in the Mathieson type of decomposer or denuder is due to a large number of short circuited cells in which the amalgam is anode and the graphite is cathode, the high efficiency of this type of decomposer or denuder is because the water or caustic soda solution must force its way in a very thin film between the amalgam and graphite surfaces so that the resistance between the anode and cathode is a minimum.

In the aforementioned Mathieson decomposers or denuders the graphite packing must be held firmly in place to prevent its movement and also to prevent the evolved hydrogen as it rises from tending to grind together the pieces of packing producing fines which may clog the tower or contaminate the caustic liquor.

Both from theoretical and practical considerations it would seem for the De Nora tower type of decomposer or denuder that the efficiency of the column is more or less independent of the amalgam droplet size entering the packing, and thus the size of holes in the distributor at the top of the column is not a deciding factor, that within the limit imposed by flooding, pressure drop and contact time the efficiency is independent of column diameter, and that the efficiency can be increased by having a greater surface of packing available for making an increased number of three-phase contacts which is best effected by employing a packing with an increased surface area per unit volume rather than by increasing the height of the column.

Furthermore, it would seem that to produce a 70% caustic alkali liquor both the De Nora type and the Mathieson type of decomposers or denuders require two stages for decomposition of alkali metal amalgam wherein one is steam heated.

The object of the present invention is to provide a process particularly adapted for the continuous production of caustic alkali solution of high concentration by a two-stage decomposition of alkali metal amalgam so as to permit a decomposer or denuder of the tower type of such compact design to be used for the carrying out of the process so that inter alia the amount of mercury held up in the decomposition of the amalgam will be reduced, that the temperature developed will be sufficient to make 70% caustic soda without application of external heating, and that there will be a reduction in consumption of energy required for pumping mercury from the denuder back to the brine mercury cell. In the process, alkali metal amalgam is decomposed in two stages on alkali metal decomposition-inducing material in the presence of an aqueous medium. The first stage takes place in a column packed with said material, and the second stage in an annulus surrounding the first stage and in heat exchange relationship with the first stage. The invention will be more fully understood from the following detailed description of preferred embodiments and from the drawing, in which:

According to one embodiment of the present invention the process particularly adapted for the continuous production of caustic alkali solutions of high concentration from alkali metal amalgam comprises allowing decomposition of a dispersion comprising fresh aqueous medium dispersed in alkali metal amalgam to occur in a column packed with alkali metal amalgam decomposition material, for example, graphite, delivering from the top of said column the resulting partially denuded alkali metal amalgam below the resulting layer of aqueous phase and also the resulting layer of aqueous phase into an annulus packed with alkali metal amalgam decomposition material, for example, graphite and surrounding said column so as to form in said annulus a dispersion of said partially denuded alkali metal amalgam in said aqueous phase, and removing caustic alkali solution formed from, for example, either the top or the base and mercury formed from the base of said packed annulus.

More specifically, this embodiment of the process of the invention particularly adapted for the continuous production of caustic alkali solutions of high concentration from alkali metal amalgam may comprise providing two reaction zones comprising a column packed with alkali metal amalgam decomposition material, for example, graphite, and, surrounding this column, an annulus packed with alkali metal amalgam decomposition material, for example, graphite, which packed annulus, in turn, is surrounded by an unpacked annulus, flooding said packed column with alkali metal amalgam, dispersing fresh aqueous medium in the alkali metal amalgam at the bottom of said packed column, permitting the resulting dispersion, together with hydrogen generated by decomposition of the alkali metal amalgam, to travel upwards through this column and to separate at the top thereof into an aqueous phase and an underlying partially denuded alkali metal amalgam, allowing said aqueous phase to overflow into the unpacked annulus and to be conducted to the base of said packed annulus and to flood it, subdividing said partially denuded alkali metal amalgam and in subdivided condition permitting it to enter at the top of said packed annulus, and removing caustic alkali solution produced from, for example, either the top or the base and mercury produced from the base of said packed annulus.

Another way of carrying out this embodiment of the process of the invention particularly adapted for the continuous production of caustic alkali solutions of high concentration from alkali metal amalgam comprises providing two reaction zones comprising a column packed with alkali metal amalgam decomposition material, for example, graphite, which is surrounded by an annulus packed with alkali metal amalgam decomposition material, for example, graphite, flooding said packed column with alkali metal amalgam, dispersing fresh aqueous medium in the alkali metal amalgam at the bottom of said packed column, permitting the resulting dispersion, together with hydrogen generated by decomposition of the alkali metal amalgam to travel upwards through this column and to separate at the top thereof into an aqueous phase on a partially denuded alkali metal amalgam, allowing said aqueous phase to overflow into the packed annulus and to flood it, subdividing said partially denuded alkali metal amalgam and in subdivided condition permitting it to enter at the top of said packed annulus, and removing caustic alkali solution produced from, for example, either the top or the base and mercury produced from the base of said packed annulus.

Thus, in carrying out this embodiment, there can be either co-current or counter-current flow of the partially denuded alkali metal amalgam and the aqueous phase in said packed annulus.

Apparatus according to the invention particularly adapted for the continuous production of caustic alkali solutions of high concentration from alkali metal amalgam in the above embodiment comprises a wall-confined column packed with alkali metal amalgam decomposition material, for example, graphite, and surrounded by a wall-confined annulus packed with alkali metal amalgam decomposition material, for example, graphite, wherein said packed wall-confined column has entry means to permit this column to be flooded with alkali metal amalgam and an entry at its base to permit the introduction of fresh aqueous medium and dispersion thereof in the alkali metal amalgam, wherein the top portion of the wall of the packed wall-confined column has communication means to permit an aqueous phase on partially denuded alkali metal amalgam at the top of this column to enter the packed wall-confined annulus and to flood it, wherein the top portion of the wall of the packed wall-confined column has an exit to permit said partially denuded alkali metal amalgam to enter subdividing means so situated at the top of said packed annulus so as to permit said partially denuded alkali metal amalgam in subdivided condition to enter at the top of said packed annulus, wherein the packed annulus has an exit for caustic alkali solution and at its base has an exit for mercury, and wherein the packed wall-confined column and the packed wall-confined annulus are in communication with an exit for hydrogen.

More specifically, one form of apparatus according to the invention particularly adapted for the continuous production of caustic alkali solutions of high concentration from alkali metal amalgam in the above embodiment comprises a wall-confined column packed with alkali metal amalgam decomposition material, for instance, graphite, and surrounded by a wall-confined annulus packed with alkali metal amalgam decomposition material, for instance, graphite, wherein said packed wall-confined column has entry means to permit this column to be flooded with alkali metal amalgam and an entry at its base to permit the introduction of fresh aqueous medium and dispersion thereof in the alkali metal amalgam, wherein the top portion of the wall of the packed wall-confined column has communication means to permit an aqueous phase overlying a layer of partially denuded alkali metal amalgam at the top of this column to overflow into the packed wall-confined annulus and to flood it, wherein the top portion of the wall of the packed wall-confined column has an exit to permit said partially denuded alkali metal amalgam to enter subdividing means so situated at the top of said packed annulus as to permit said partially denuded alkali metal amalgam in subdivided condition to enter at the top of said packed annulus, wherein the packed annulus has an exit for caustic soda and at its base has an exit for mercury, and wherein the packed wall-confined column and the packed wall-confined annulus are in communication with an exit for hydrogen.

Another form of apparatus according to the invention particularly adapted for the continuous production of caustic alkali solutions of high concentration from alkali metal amalgam in the above embodiment comprises a wall-confined column packed with alkali metal amalgam decomposition material, for instance, graphite, and surrounded by a wall-confined annulus packed with alkali metal amalgam decomposition material, for instance, graphite, and which packed annulus, in turn, is surrounded by an unpacked annulus wherein said packed wall-confined column has entry means to permit this column to be flooded with alkali metal amalgam and an entry at its base to permit the introduction of fresh aqueous medium and dispersion thereof in the alkali metal amalgam, wherein the top portion of the wall of the packed wall-confined column has communication means to permit an aqueous phase on partially denuded alkali metal amalgam at the top of this column to overflow into the unpacked annulus, wherein the wall of said wall-confined packed annulus has an entry near its base to permit said aqueous phase to enter from the unpacked annulus and to flood the packed annulus, wherein the top portion of the wall of the packed wall-confined column has an exit to permit said partially denuded alkali metal amalgam to enter subdividing means so situated at the top of said packed annulus as to permit said partially denuded alkali metal amalgam in subdivided condition to enter at the top of said packed annulus, wherein the packed annulus has an exit for caustic alkali, for instance, in its top portion and at its base has an exit for mercury, and wherein the packed wall-confined column, the packed wall-confined annulus and the unpacked annulus are in communication with an exit for hydrogen.

In effect, in said packed column of each form of apparatus according to the invention the decomposition of the alkali metal amalgam proceeds in the same way as in a Mathieson type denuder, although said column may be much narrower than is usual for this type of denuder. Furthermore, both the alkali metal amalgam and the aqueous medium travel upward co-currently through the column. The decomposition of the alkali amalgam in said packed annulus proceeds in the same way as in a De Nora type denuder.

Hot strong amalgam from a brine cell is preferably so fed through a pipe to the base of the packed column as to flood it and be in the pipe in counter-current heat-exchange relationship with the amalgam rising in the packed column.

The term "fresh aqueous medium" is used above and throughout the description which follows to refer to either water or a dilute caustic alkali solution in which the concentration of caustic alkali is not higher than about 20% by weight.

When graphite is used as the alkali metal amalgam decomposition material the graphite may be in the form of ½" to 1" lumps or ½" diameter Raschig rings. The packing surface presented by ½" diameter Raschig rings is about 3 times that of ½–1" lumps. The graphite may be, for instance, specially treated or impregnated graphite.

Fresh aqueous medium is introduced under pressure through a distributor at the base of said column so that the fresh aqueous medium and the strong amalgam travel upwards through the packing together with the hydrogen gas generated by the decomposition reaction. Because of the large density difference the aqueous phase and the amalgam phase separate very easily at the top of this column. The upper aqueous phase in this graphite packed column overflows, for instance, to the unpacked annulus by which it is conveyed to the base of the packed annulus. The amalgam phase at the top of the graphite packed column enters a distributor which divides it into numerous streams or droplets for dispersal and decomposition in the packed annulus. Strong caustic liquor is taken, for example, from the top of the packed annulus and from its base the denuded mercury is pumped back to the brine cell.

Heat is conserved efficiently in the apparatus of the invention. Not only as previously remarked is the hot amalgam from the brine cell in counter-current heat-exchange relationship with the amalgam rising in the graphite packed column, but it is also in counter-current heat-exchange relationship with the water rising in the graphite packed column. In turn, the second stage of the denudation operation occurs in what in effect is a jacket to the first stage. The apparatus of the invention may well be lagged.

Figure 1:
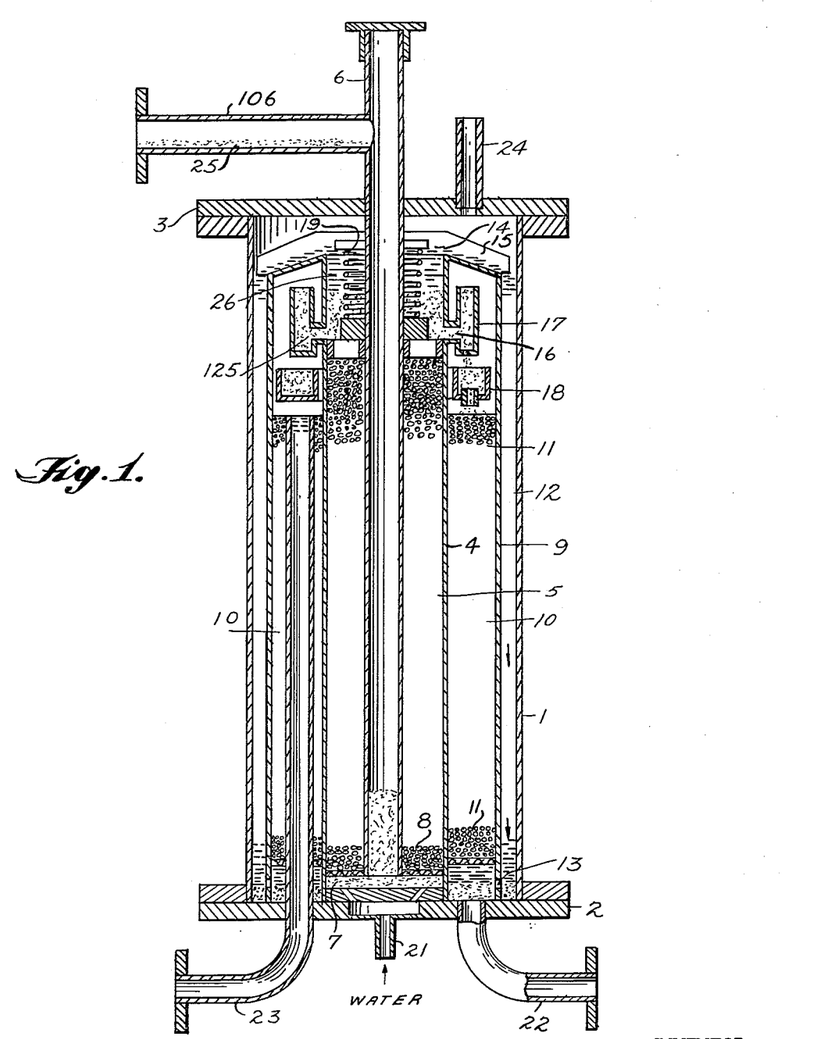
FIGURE 1 is an elevation partially in section of apparatus used in accordance with the invention.

An example of the above embodiment of apparatus according to the invention for the carrying out of the process of the invention is illustrated in the FIGURE 1 drawing wherein 1 is the outer cylindrical wall of a decomposer or denuder 3 feet high, 2 is the base and 3 is the cover. 4 is the surrounding wall of the central column 5 which is 6 inches in diameter. The column 5 has a central pipe 6 of two inch diameter, which has a lateral inlet pipe 106 fitted through a T joint, leading to near the base 2 to form a gap 7, has a packing 8 of graphite rings, and is surrounded by a wall 9 to form an annulus 10 which is 3 inches wide. The annulus 10 is packed with graphite lumps 11. Wall 9 with the outer cylindrical wall 1 forms an annulus 12 which is unpacked. In the lower portion of wall 9 there are several holes 13.

The wall 4 near its top portion has depressions 14 for overflow-chutes 15 leading to the top portion of the annulus 12.

Wall 4 below the depressions 14 has holes 16 into which are fitted primary distributors 17 placed above a secondary distributor 18 which is in the form of an annular trough having holes in its base.

19 is a spring in column 5 to hold in position the packing 8 of graphite rings. Springs in annulus 10 hold in position the packing 11 of graphite lumps.

21 is a distributor leading into the central column 5 at the base 2. 22 is a pipe which passes through the base 2 and one end of which is at the bottom of the annulus 10. 23 is a pipe which passes through the base 2 and one end of which is in the top portion of annulus 10.

24 is an exit for gas and passes through the cover 3.

Hot alkali metal amalgam 25 from a brine cell (not shown) is fed via pipe 6 to the base of the graphite ring packed column 5, then through the gap 7 so as to flood the column 5 with the alkali metal amalgam 25. Water is introduced under pressure through the distributor 21 so that the water and the alkali metal amalgam 25 travel upwardly through the graphite ring packing 8 together with the hydrogen generated by the decomposition reaction which escapes through pipe 24. At the top of column 5 an aqueous phase 26 forms on the partially denuded alkali metal amalgam 125. The aqueous phase 26 overflows by way of the overflow-chutes 15 into the unpacked annulus 12 by which it is conveyed to the base of the packed annulus 10 through holes 13 in wall 9. The partially denuded alkali metal amalgam 125 passes out of the column 5 through holes 16 into the primary distributor 17 and then into the secondary distributor 18 which divides it into numerous streams and droplets for dispersal and decomposition in the graphite packed annulus 10.

Strong caustic liquor is taken from the upper portion of the graphite packed annulus 10 by pipe 23 and from its lower portion at base 2 mercury is taken away by pipe 22 and is pumped back to the brine cell (not shown).

A denuder of this embodiment of the invention, as described above, by way of example, has been compared in extensive works trials with a two-stage De Nora tower type denuder, and it has been found for the denuder of the invention that the hold up of mercury is lower by about 25%, that caustic liquor of 68% to 70% strength can be produced without the use of external heating, and that only about half as much power for pumping is required.

A modified embodiment of the process of the present invention comprises allowing decomposition of a dispersion comprising an aqueous medium dispersed in alkali metal amalgam to occur in a column packed with alkali metal amalgam decomposition material, for instance, graphite, delivering from the top of said column the resulting partially denuded alkali metal amalgam below the resulting layer of aqueous phase into an annulus packed with alkali metal amalgam decomposition material, for instance, graphite, and surrounding said column and introducing fresh aqueous medium into said packed annulus so as to form in said packed annulus a dispersion of said partially denuded alkali metal amalgam in said fresh aqueous medium, removing the resulting caustic alkali solution from said packed annulus and introducing it into the bottom of the packed column to form therein said dispersion comprising an aqueous medium dispersed in alkali metal amalgam, and removing said resulting layer of aqueous phase delivered from said packed column as caustic alkali solution of high concentration. In this modification fresh aqueous medium is supplied to the packed annulus rather than the packed central column.

The apparatus according to the present invention adapted to this modified embodiment of the process comprises a wall-confined column packed with alkali metal amalgam decomposition material, for instance, graphite, and surrounded by a wall-confined annulus packed with alkali metal amalgam decomposition material, for instance, graphite, wherein said packed wall-confined column has entry means to permit this column to be flooded with alkali metal amalgam and an entry at its base to permit the introduction of aqueous medium and dispersion thereof in the alkali metal amalgam, wherein the top portion of the wall of the packed wall-confined column has an exit for an aqueous phase in the form of caustic alkali solution of high concentration on partially denuded alkali metal amalgam at the top of this column, wherein the top portion of the wall of the packed wall-confined column has an exit to permit said partially denuded alkali metal amalgam to enter subdividing means so situated at the top of said packed annulus as to permit said partially denuded alkali metal amalgam in subdivided condition to enter at the top of said packed annulus, wherein the packed annulus has an exit for caustic alkali solution which is connected by way of pressure means to said entry at the base of the packed column to permit caustic soda solution from said packed annulus to enter said packed column, wherein the packed annulus has an entry at the bottom thereof to permit an aqueous medium to be introduced therein, and wherein the packed wall-confined column and the packed wall-confined annulus are in communication with an exit for hydrogen.

Figure 2:
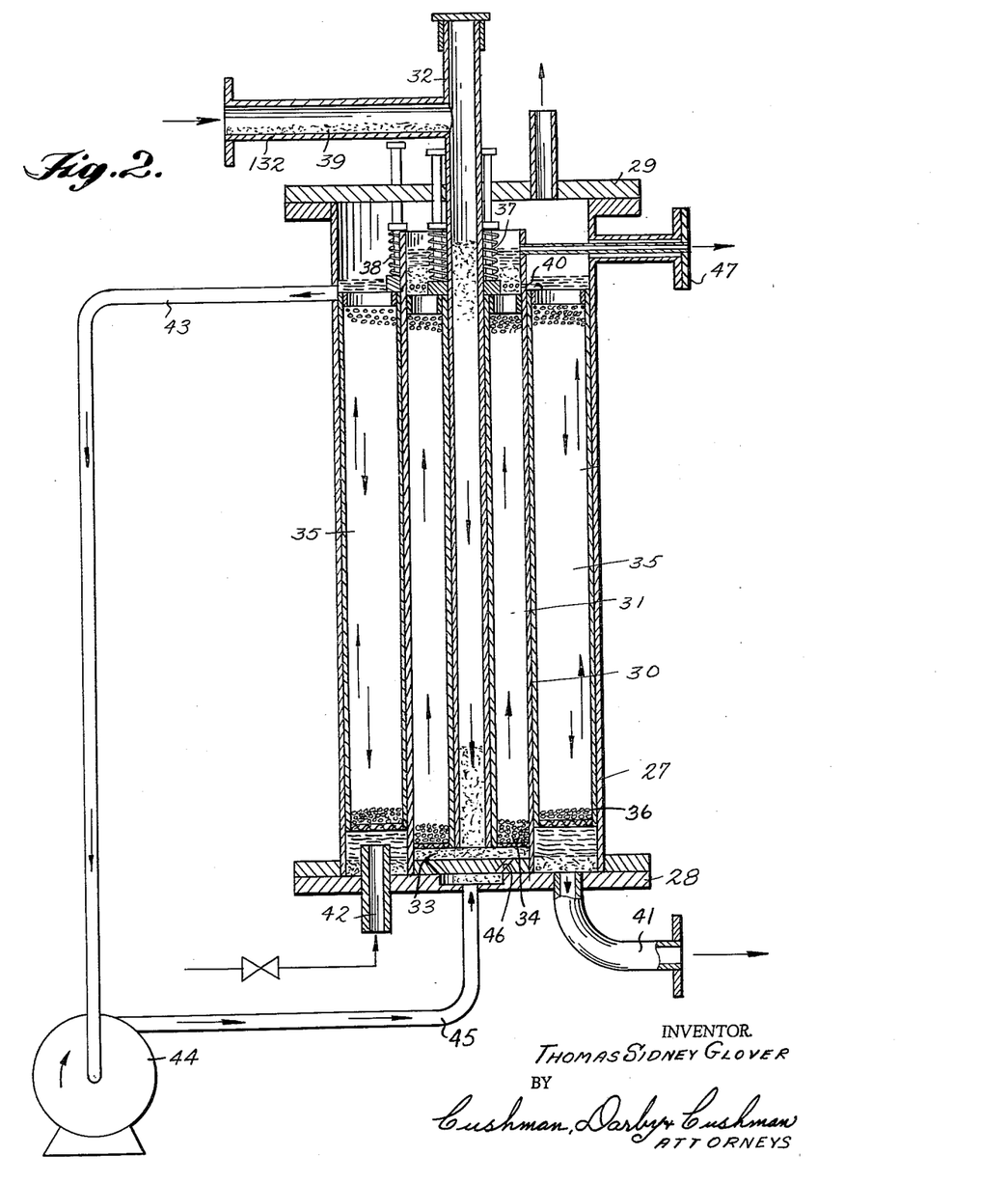
FIGURE 2 is an elevation partially in section of apparatus used in a modified embodiment of the invention.

Apparatus suitable for carrying out this modified embodiment is shown in FIGURE 2. The outer cylindrical shell 27 is closed at its ends by a bottom plate 28 and a cover 29. Within the shell is a cylindrical wall 30 enclosing a packed column 31 surrounding a central vertical pipe 32. The pipe has a side inlet pipe 132 coupled by a T joint which is connected to a source of e.g. sodium amalgam. The pipe 32 extends to near the bottom of the column 31, there being a shallow open space 33 at the bottom. Within the column is a packing of graphite rings 34 which terminate, at their lower end, above space 33.

There is an annulus 35 between inner wall 30 and shell 27 which contains a graphite ring packing 36. Springs 37 and 38 press down the packings of column 31 and annulus 35, respectively. Sodium amalgam 39 enters the column through inlet 132 and flows downwardly through pipe 32 where it heats column 31. When the amalgam reaches the base of the column 31 it flows upwardly through the column and floods the packing 34. The amalgam reacts with aqueous liquid in the column and flows to the top where it separates as a lower layer beneath a layer of concentrated caustic alkali solution. The partially denuded amalgam overflows through a series of small holes 40, which subdivide it, onto packed column 36 where it is dispersed in fresh aqueous medium and further decomposed. Then the fully denuded amalgam is discharged from the lower end of the annulus through pipe 41. Fresh water enters the annulus at 42 and floods the packing 36 as it flows upwardly. It overflows into pipe 43 and is moved by pump 44 through pipe 45 to a distributor 46. There it is forced through and into the amalgam in column 31 to form an aqueous medium in amalgam dispersion. Finally, it rises through column 30 to form a supernatant layer above partially denuded amalgam at the top of the column and to flow to a receiver through pipe 47.

In accordance with a further modified embodiment of the present invention there is provided a two-stage process for the continuous production of caustic alkali solution, particularly of high concentration, in which alkali metal amalgam is decomposed in a column packed with alkali metal amalgam decomposition material, for example, graphite, and then in an annulus surrounding said column and packed with alkali metal amalgam decomposition material, for example, graphite, in such a way that in addition to there being a reduction in the amount of mercury held up in the decomposition of the amalgam, to the temperature developed being sufficient to make, for example, 70% caustic alkali without application of external heating, and to there being a reduction in consumption of energy required for pumping mercury from the denuder back to the brine mercury cell, as in the above embodiments, there is also a reduction in area of surface of the decomposer or denuder contacted by the caustic alkali solution of high concentration, and there is also no necessity to pump caustic alkali solution from the packed annulus to the packed column.

According to this further modified embodiment of the invention the process for the continuous production of caustic alkali solutions, particularly of high concentration, from alkali metal amlagam comprises introducing an alkali metal amalgam and fresh aqueous medium into a column packed with alkali metal amalgam decomposition material, for example, graphite, so as to form therein a dispersion comprising water dispersed in said alkali metal amalgam, allowing decomposition of the alkali metal amalgam in said dispersion to occur in said column, delivering from the top of said column the resulting partially denuded alkali metal amalgam adjacent the top of said column and collecting below the separated layer of aqueous phase into an annulus surrounding said column and packed with alkali metal amalgam decomposition material, for example, graphite, introducing additional fresh aqueous medium into said packed annulus so as to form in said packed annulus a dispersion comprising said partially denuded alkali metal amalgam in aqueous medium, permitting the resulting caustic alkali solution formed in said packed annulus to be removed therefrom, removing said separated layer of aqueous phase at the top of said packed column as caustic alkali solution of high concentration, and removing mercury formed from the base of said packed annulus.

A preferred way of carrying out this further modified process for the continuous production of caustic alkali solution, particularly of high concentration, from alkali metal amalgam comprises introducing an alkali metal amalgam and fresh aqueous medium into a column packed with an alkali metal amalgam decomposition material, for example, graphite, so as to form therein a dispersion comprising water dispersed in said alkali metal amalgam, allowing decomposition of the alkali metal amalgam in said dispersion to occur in said column, delivering from the top of said column the resulting partially denuded alkali metal amalgam adjacent the top of said column and collecting below the separated layer of aqueous phase into an annulus surrounding said column and packed with alkali metal amalgam decomposition material, for example, graphite, introducing additional fresh aqueous medium into said packed annulus so as to form in said packed annulus a dispersion comprising said partially denuded alkali metal amalgam in aqueous medium, permitting the resulting caustic alkali solution formed in said packed annulus to overflow into and mix with said separated layer of aqueous phase at the top of said packed column, removing this separated layer of aqueous phase thus treated as caustic alkali solution of high concentration from the top of said packed column and removing mercury formed from the base of said packed annulus.

Preferably, the separated layer of aqueous phase at the top of said packed column and said resulting partially denuded alkali metal amalgam below this layer of aqueous phase are formed by introducing the alkali metal amalgam into said packed column so as to flood it, dispersing the fresh aqueous medium in the alkali metal amalgam at the bottom of said packed column and permitting the resulting dispersion, together with the hydrogen generated by decomposition of the alkali metal amalgam, to travel upwards through this column and to separate at the top thereof into said aqueous phase on said partially denuded alkali metal amalgam.

Furthermore, preferably the resulting partially denuded alkali metal amalgam below the separated layer of aqueous phase at the top of said packed column is delivered in subdivided condition to the top of said packed annulus.

In said packed annulus there is counter-current flow of the partially denuded alkali metal amalgam and the introduced water or dilute aqueous solution of caustic alkali.

Apparatus according to this further modified embodiment of the present invention for the continuous production of caustic alkali solutions, particularly of high concentration, from alkali metal amalgam comprises a wall-confined column packed with alkali metal amalgam decomposition material, for instance, graphite, and surrounded by a wall-confined annulus packed with alkali metal amalgam decomposition material, for instance, graphite, wherein said packed wall-confined column has inlet means for the introduction of alkali metal amalgam into the base portion thereof to permit this column to be flooded with alkali metal amalgam and an inlet distributing means at its base to permit the introduction and dispersion of fresh aqueous medium into the alkali metal amalgam, wherein the top of the wall of the packed wall-confined column has an exit for an aqueous phase in the form of caustic alkali solution of high concentration which collects as a pool on top of the partially denuded alkali metal amalgam at the top of this column, wherein subdividing means are provided at the top of the wall of the packed wall-confined column to permit said partially denuded alkali metal amalgam to enter in subdivided condition at the top of said packed annulus, wherein the packed annulus has an entry at the bottom thereof to permit fresh aqueous medium to be introduced therein, wherein the packed wall-confined annulus has an exit for the caustic alkali solution formed in said packed annulus, wherein the packed wall-confined annulus has an exit at its base for mercury, and wherein the packed wall-confined column and the packed wall-confined annulus are in communication with an exit for hydrogen.

Apparatus according to a preferred form of this further modified embodiment of the invention for the continuous production of caustic alkali solutions, particularly of high concentration, from alkali metal amalgam comprises a wall-confined column packed with alkali metal amalgam decomposition material, for instance, graphite, and surrounded by a wall-confined annulus packed with alkali metal amalgam decomposition material, for instance, graphite, wherein said packed wall-confined column has inlet means for the introduction of alkali metal amalgam into the base portion thereof to permit this column to be flooded with alkali metal amalgam and an inlet distributing means at its base to permit the introduction and dispersion of fresh aqueous medium into the alkali metal amalgam, wherein the top of the wall of the packed wall-confined column has an exit for an aqueous phase in the form of caustic alkali solution of high concentration which collects as a pool on top of the partially denuded alkali metal amalgam at the top of this column, wherein subdividing means are provided at the top of the wall of the packed wall-confined column to permit said partially denuded alkali metal amalgam to enter in subdivided condition at the top of said packed annulus, wherein the packed annulus has an entry at the bottom thereof to permit fresh aqueous medium to be introduced therein, wherein the top portion of the wall of the packed wall-confined column permits caustic alkali solution formed in and at the top of said packed annulus to overflow into and mix with said aqueous phase on top of said partially denuded alkali metal amalgam at the top of this column, wherein the packed wall-confined annulus has an exit at its base for mercury, and wherein the packed wall-confined column and the packed wall-confined annulus are in communication with an exit for hydrogen.

Said subdividing means at the top of the wall of the packed wall-confined column may be, for example, either a series of circumferential exits through said wall or an exit or exits in said wall in conjunction with a distributor at the top of said packed annulus.

In effect, in said packed column the decomposition of the alkali metal amalgam proceeds in the same way as in a Mathieson type denuder, although said column may be much narrower than is usual for this type of denuder. Furthermore, both the alkali metal amalgam and the introduced fresh aqueous medium travel upwards co-currently through the column. The decomposition of the alkali amalgam in said packed annulus proceeds in the same way as in a De Nora type denuder.

Preferably, the inlet means of the packed column for the introduction of alkali metal amalgam into the base portion of this column to permit this column to be flooded with alkali metal amalgam is a pipe so positioned therein as to enable hot strong amalgam from a brine cell to be fed to the base of said column and to flood it and to be in the pipe in counter-current heat-exchange relationship with the amalgam rising in the packed column.

When graphite is used as the alkali metal amalgam decomposition material the graphite may be in the form of ½" to 1" lumps or ½" diameter Raschig rings. The packing surface presented by ½" diameter Raschig rings is about three times that of ½" to 1" lumps.

A preferred manner of carrying out the preferred form of this further modified embodiment of the invention is to introduce fresh aqueous medium through a distributor at the base of said column so that the water or dilute aqueous caustic soda and the strong amalgam travel upwards through the packing together with the hydrogen gas generated by the decomposition reaction, and also to introduce water or dilute aqueous caustic soda at the base of the packed annulus. In the packed column, because of the large density difference, the aquoeus phase and the amalgam phase separate very easily at the top thereof. The amalgam phase at the top of the packed column enters a distributor which divides it into numerous streams or droplets for dispersal and decomposition in the packed annulus. The separated aqueous phase at the top of the packed column is strong caustic liquor and is withdrawn, for example, through a wall-enclosed conduit which is connected to an exit at said top of the wall of the packed wall-confined column and passes through the wall of the wall-confined annulus. Preferably, therefore, the exit for the caustic alkali solution of high concentration at the top of the packed wall-confined column is at the top of the wall of said packed wall-confined column and is connected to a wall-confined conduit which passes through the wall of the packed wall-confined annulus. From the base of the packed annulus mercury is pumped back to the brine cell.

Heat is conserved efficiently in the apparatus of the invention. Not only is the hot amalgam from the brine cell in counter-current heat-exchange relationship with the amalgam rising in the packed column, but it is also in counter-current heat-exchange relationship with the water rising in the packed column. In turn, the second stage of the denudation operation, i.e., the decomposition of partially denuded alkali metal amalgam in the packed annulus, occurs in what in effect is a jacket to the first stage, i.e., the decomposition of fresh alkali metal amalgam in the packed column. The apparatus of the invention may be lagged.

Figure 3:
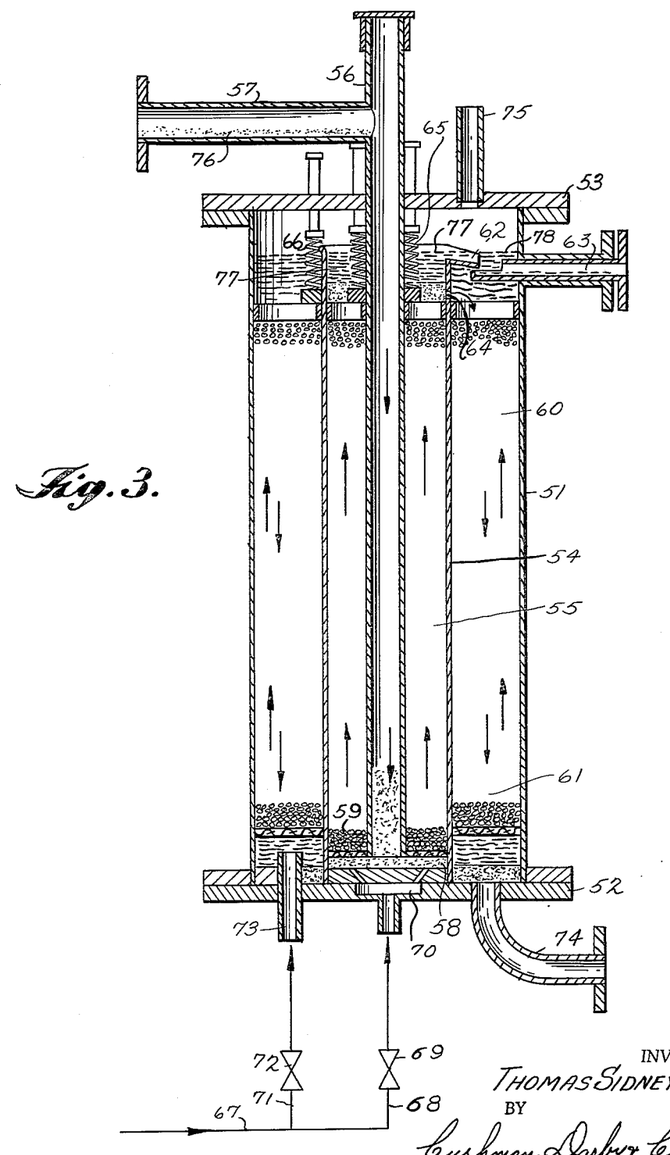
FIGURE 3 is an elevation partially in section of apparatus used in a further modified embodiment of the invention.

An example of apparatus of a preferred embodiment of apparatus according to the invention for the carrying out of a preferred embodiment of the process of the invention is illustrated in FIGURE 3 wherein 51 is the outer cylindrical wall of a decomposer or denuder 3' high, 52 is the base and 53 is the cover. 54 is the surrounding wall of the central column 55 which is 6" in diameter. The column 55 has a central pipe 56 of 2" diameter having a side inlet pipe 57 connected through a T joint leading to near the base 52 to form a gap 58, and has a packing 59 of graphite rings. The surrounding wall 54 and the outer cylindrical wall 51 form an annulus 60 which is 3" wide. The annulus 60 is packed with graphite lumps 61.

The surrounding wall 54 in its top portion has an exit pipe 62 leading into pipe 63 passing through the top portion of annulus 60 and through the cylindrical wall 51. Wall 54 below exit pipe 62 has holes 64 for feeding the partially denuded alkali metal amalgam to the annulus 60.

65 is a spring in column 55 to hold in position the packing 59 of graphite rings. 66 are springs in annulus 60 to hold in position the packing 61 of graphite lumps.

67 is a branched water feed pipe, one branch 68 of which is controlled by cock 69 and passes into a distributor 70 leading into the central column 55 at the base 52 and the other branch 71 of which is controlled by cock 72 and passes into an entry pipe 73 leading into annulus 60 at the base 52.

74 is a pipe which passes through the base 52 and one end of which is at the bottom of the annulus 60.

75 is an exit for gas and passes through the cover 53. Hot alkali metal amalgam 76 from a brine cell (not shown) is fed via inlet 57 and pipe 56 to the base of the graphite ring-packed column 55, then through the gap 58 so as to flood the column 55 with the alkali metal amalgam 76. Water is introduced through the distributor 70 so that the water and the alkali metal amalgam 76 travel upwards through the graphite ring packing and together with the hydrogen generated by the decomposition reaction which escapes through pipe 75. At the top of column 55 a pool of the aqueous phase 77 forms on top of the partially denuded alkali metal amalgam.

The partially denuded alkali metal amalgam passes out of the column 55 through holes 64 which divide it into numerous streams and droplets for dispersal and decomposition by water which is introduced through entry pipe 73 into the graphite-packed annulus 60. Said numerous streams and droplets descend in counter-current to the rising stream of aqueous phase.

At level 78 in the graphite-packed annulus 60 the caustic liquor which is formed by the decomposition of the streams and droplets of the partially denuded alkali metal amalgam overflows into the aqueous phase 77 at the top of the central column 55 and the resulting mixture is withdrawn as strong caustic liquor through pipe 63.

From the lower portion of the annulus 60 at the base 52 mercury is taken away by pipe 74 and is pumped back to the brine cell (not shown).

It is found, for example, in any period of time by splitting the water feed through the branched pipe 67 between the central column 55 and the annulus 60 so that the major portion is fed through pipe 68 to the central column 55 and the balance is fed through pipe 71 to the base of the annulus 60, that only a small quantity of relatively weak caustic liquor (e.g. 30–40% sodium hydroxide) need be made in annulus 60 and a much larger quantity of strong liquor (e.g. 74% sodium hydroxide) can be made as the aqueous layer 77 in the central column 55 and that as the relatively weak caustic liquor at level 78 in the annulus 60 overflows into the much stronger caustic liquor forming the aqueous layer 77 in column 55 the final strength of the aqueous layer 77 as it overflows into and is withdrawn through pipe 63 is, for example, 70% caustic soda.

It is also found that the process of this further modified embodiment of the present invention permits counter-current washing with water or weak caustic liquor of partially denuded mercury amalgam before return of the resulting mercury to the brine cell; flexibility of operation in periods of fluctuating loads; and control not only of the decomposition of the alkali metal amalgam in the packed column 55, but also control of the decomposition reaction of the partially denuded alkali metal amalgam in the packed annulus 60.

Furthermore, as the only part of a denuder according to the invention in contact with, say, 70–74% caustic alkali is the comparatively small zone 77 at the top of the central column 55, any problem concerning materials of construction is a relatively simple one.

Again, it is found that the process of the invention easily lends itself to instrumentation.

A denuder of this further modified embodiment of the invention as described herein by way of example has been compared in extensive works trials with a two-stage De Nora tower type denuder, and it has been found for the denuder of the invention that the hold-up of mercury in the apparatus is lower by about 25%, that caustic liquor of 68–70% strength can be produced without the use of external heating, and that only about half as much power for pumping mercury is required. This saving in power for pumping mercury is because, according to the invention, the two stages of denuding are carried out in decomposition zones which are disposed on the same level, i.e., one inside the other and not one above the other, as in the two-stage De Nora tower type of denuder.

Although in the process and apparatus of the invention the alkali metal amalgam decomposition material is usually graphite, other alkali metal amalgam decomposition materials which can be employed are, for instance, graphite-iron compacts, graphite-nickel compacts, sintered iron-graphite, and silicon carbide.

This application is a continuation-in-part of Serial Nos. 785,170 and 32,709, filed January 6, 1959, and May 31, 1960, respectively, and both now abandoned.

I claim:

1. A process for the continuous production of caustic alkali solutions of high concentrations which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from the top part of said packing, dispersing the partially denuded amalgam in the caustic alkali-containing aqueous medium to form an amalgam-in-aqueous medium dispersion, decomposing the resulting dispersion on a packing of alkali metal amalgam decomposition material in a second confined zone surrounding the first confined zone, and removing caustic alkali solution and mercury metal from said second confined zone.

2. A process for the continuous production of caustic alkali solutions of high concentrations which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from said packing, separating the partially denuded amalgam from said caustic alkali-containing aqueous medium, dispersing the partially denuded amalgam in said caustic alkali-containing aqueous medium to form an amalgam-in-aqueous medium dispersion, decomposing the resulting dispersion on a packing of alkali metal decomposition material in a second confined zone surrounding the first confined zone, and removing caustic alkali solution and mercury metal from said second confined zone.

3. A process for the continuous production of caustic alkali solutions of high concentration which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from said packing, separating the partially denuded amlagam from said caustic alkali-containing aqueous medium, flooding an alkali metal amalgam decomposition material packing in a second confined zone surrounding the first confined zone with said caustic alkali-containing aqueous medium, dispersing the partially denuded amalgam in said caustic alkali-containing aqueous medium to form an amalgam-in-aqueous medium dispersion, decomposing the resulting dispersion on the packing in said second confined zone, and removing caustic alkali solution and mercury metal from said second confined zone.

4. A process as set forth in claim 3 including breaking up the partially denuded alkali metal amalgam and dropping it onto the top of the flooded second confined zone of alkali metal amalgam decomposition material, thereby forming said amalgam-in-aqueous medium dispersion.

5. A process as set forth in claim 3 including transferring said caustic alkali-containing aqueous medium from the upper end of said first zone of packing to the lower end of said second zone and injecting it upwardly into said second zone to flood the zone.

6. A process as set forth in claim 3 in which the caustic alkali-containing aqueous medium is injected into the upper end of said second zone to flood the zone.

7. A reactor for hydrolyzing an alkali metal amalgam which comprises a first confined column containing alkali metal amalgam decomposition material packing, a second confined annular column containing alkali metal amalgam decomposition material packing surrounding and in heat-exchange relationship with said first column, means for flooding said first column with alkali metal amalgam from the lower end thereof, means for propelling an aqueous liquid into the alkali metal amalgam to form an aqueous medium-in-amalgam dispersion, means for receiving partially denuded amalgam and aqueous caustic solution from the upper portion of said first column, means for separating said partially denuded amalgam from said aqueous caustic solution, means for flooding said annular column with said aqueous caustic solution, means for subdividing said partially denuded amalgam and dispersing it in said aqueous caustic solution, to form an amalgam-in-aqueous caustic solution dispersion, means for removing mercury from said annular column, and means for removing concentrated caustic alkali from said annular column.

8. A reactor as set forth in claim 7 in which said means for flooding said annular column with aqueous caustic solution includes a passageway between said separating means and the lower portion of said annular column and means for introducing said aqueous caustic solution into the lower portion of said annular column.

9. A reactor as set forth in claim 8 in which the means for removing concentrated caustic alkali from said annular column is positioned adjacent the top of said annular column.

10. A reactor as set forth in claim 7 in which said separating means and said flooding means comprise an overflow chamber receiving the aqueous caustic solution and emptying into said annular column.

11. A reactor as set forth in claim 7 including a brine cell and means for supplying hot strong amalgam from said cell to said means for flooding said first confined column with alkali metal amalgam, said flooding means comprising a pipe positioned within said column for counter-current heat-exchange between amalgam in said pipe and amalgam rising in said column, the lower portion of said pipe communicating with the lower portion of said first confined column.

12. A reactor as set forth in claim 7 in which said means for propelling aqueous liquid into the alkali metal amalgam comprises a distributor and means for supplying said aqueous liquid under pressure to said distributor, said distributor being positioned to propel aqueous liquid upwardly through the column, together with hydrogen gas generated by the decomposition.

13. A process for the continuous production of caustic alkali solutions of high concentrations which comprises dispersing a caustic alkali-containing aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and the concentration of said caustic alkali-containing aqueous medium is increased, withdrawing the partially denuded amalgam and resulting more concentrated caustic alkali-containing aqueous medium from the top part of said packing, dispersing the partially denuded amalgam in an aqueous medium to form an amalgam-in-aqueous medium dispersion, decomposing the resulting dispersion on a packing of alkali metal amalgam decomposition material in a second confined zone surrounding the first confined zone, removing caustic alkali-containing aqueous medium and mercury metal from said second confined zone and returning said caustic alkali-containing aqueous medium for dispersing in fresh alkali metal amalgam to be decomposed on the packing in said first confined zone.

14. A process for the continuous production of caustic alkali solutions of high concentrations which comprises dispersing a caustic alkali-containing aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and the concentration of said caustic alkali-containing aqueous medium is increased, withdrawing the partially denuded amalgam and resulting more concentrated caustic alkali-containing aqueous medium from the top part of said packing, separating said partially denuded amalgam from said more concentrated caustic alkali-containing aqueous medium, dispersing the partially denuded amalgam in the aqueous medium to form an amalgam-in-aqueous medium dispersion, decomposing the resulting dispersion on a packing of alkali metal amalgam decomposition material in a second confined zone surrounding the first confined zone, removing caustic alkali-containing aqueous medium and mercury metal from said second confined zone and returning said caustic alkali-containing aqueous medium for dispersing in fresh alkali metal amalgam to be decomposed on the packing in said first confined zone.

15. A process for the continuous production of caustic alkali solutions of high concentrations which comprises dispersing a caustic alkali-containing aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and the concentration of said caustic alkali-containing aqueous medium is increased, withdrawing the partially denuded amalgam and resulting more concentrated caustic alkali-containing aqueous medium from the top part of said packing, separating the partially denuded amalgam from said more concentrated caustic alkali-containing aqueous medium, flooding an alkali metal amalgam decomposition material packing in a second confined zone surrounding the first confined zone, dispersing the partially denuded amalgam in an aqueous medium to form an amalgam-in-aqueous medium dispersion, decomposing the resulting dispersion on the packing in said second confined zone, removing caustic alkali-containing aqueous medium and mercury metal from said second confined zone and returning said caustic alkali-containing aqueous medium for dispersing in fresh alkali metal amalgam to be decomposed on the packing in said first confined zone.

16. A process as set forth in claim 15 including breaking up the partially denuded alkali metal amalgam and dropping it onto the top of the flooded second confined zone of alkali metal amalgam decomposition material, thereby forming said amalgam-in-aqueous medium dispersion.

17. A reactor for hydrolyzing an alkali metal amalgam which comprises a first confined column containing alkali metal amalgam decomposition material packing, a second confined annular column containing alkali metal amalgam decomposition material packing surrounding and in heat-exchange relationship with said first column, means for flooding said first column with alkali metal amalgam from the lower end thereof, means for propelling an aqueous caustic solution into the alkali metal amalgam to form an aqueous medium-in-amalgam dispersion, means for receiving partially denuded amalgam and aqueous caustic solution from the upper portion of said first column, means for separating said partially denuded amalgam from said aqueous caustic solution, means for flooding said annular column with an aqueous medium, means for subdividing said partially denuded amalgam and dispersing it in said aqueous caustic solution to form an amalgam-in-aqueous medium dispersion, means for removing mercury from said annular column, means for removing aqueous caustic solution from said annular column and delivering it to said propelling means, and means for removing said aqueous caustic solution from the reactor.

18. A process for the continuous production of caustic alkali solutions of high concentrations which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from the top part of said packing, dispersing the partially denuded amalgam in additional aqueous medium to form an amalgam-in-aqueous medium dispersion, decomposing the resulting dispersion on a packing of alkali metal amalgam decomposition material in a second confined zone surrounding the first confined zone, and removing caustic alkali solution and mercury metal from said second confined zone.

19. A process for the continuous production of caustic alkali solutions of high concentrations which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from said packing, separating the partially denuded amalgam from said caustic alkali-containing aqueous medium, dispersing the partially denuded amalgam in additional aqueous medium to form an amalgam-in-aqueous medium dispersion, decomposing the resulting dispersion on a packing of alkali metal decomposition material in a second confined zone surrounding the first confined zone, and removing caustic alkali solution and mercury metal from said second confined zone.

20. A process for the continuous production of caustic alkali solutions of high concentrations which comprises dispersing an aqueous medium in an alkali metal amalgam to form an aqueous medium-in-amalgam dispersion, decomposing the resulting dispersion on an alkali metal amalgam decomposition material packing in a first confined zone, whereby the amalgam is partially denuded and caustic alkali is formed, withdrawing the partially denuded amalgam and resulting caustic alkali-containing aqueous medium from said packing, separating the partially denuded amalgam from said caustic alkali-containing aqueous medium, flooding an alkali metal amalgam decomposition material packing in a second confined zone surrounding the first confined zone with additional aqueous medium, dispersing the partially denuded amalgam in said additional aqueous medium to form an amalgam-in-aqueous medium dispersion, decomposing the resulting dispersion on the packing in said second confined zone, and removing caustic alkali solution and mercury metal from said second confined zone.

21. A process as set forth in claim 20 including breaking up the partially denuded alkali metal amalgam and dropping it onto the top of the flooded second confined zone of alkali metal amalgam decomposition material, thereby forming said amalgam-in-aqueous medium dispersion.

22. A process as set forth in claim 20 including combining the caustic alkali solutions formed in said first and said second confined zones.

23. A process as set forth in claim 20 in which the alkali metal decomposition material is graphite.

24. A reactor for hydrolyzing an alkali metal amalgam which comprises a first confined column containing alkali metal amalgam decomposition material packing, a second confined annular column containing alkali metal amalgam decomposition material packing surrounding and in heat-exchange relationship with said first column, means for flooding said first column with alkali metal amalgam from the lower end thereof, means for propelling an aqueous liquid into the alkali metal amalgam to form an aqueous medium-in-amalgam dispersion, means for receiving partially denuded amalgam and aqueous caustic solution from the upper portion of said first column, means for separating said partially denuded amalgam from said aqueous caustic solution, means for flooding said annular column with additional aqueous medium, means for subdividing said partially denuded amalgam and dispersing it in said additional aqueous medium to form an amalgam-in-aqueous caustic solution dispersion, means for removing mercury from said annular column, and means for removing concentrated caustic alkali from said annular column.

25. A reactor as set forth in claim 24 in which the means for removing concentrated caustic alkali from said annular column is positioned adjacent the top of said annular column.

26. A reactor as set forth in claim 25 including means for combining the caustic alkali solutions produced in said first and second columns.

27. A reactor as set forth in claim 24 including a brine cell and means for supplying hot strong amalgam from said cell to said means for flooding said first confined column with alkali metal amalgam, said flooding means comprising a pipe positioned within said column for counter-current heat-exchange between amalgam in said pipe and amalgam rising in said column, the lower portion of said pipe communicating with the lower portion of said first confined column.

28. A reactor as set forth in claim 24 in which said means for propelling aqueous liquid into the alkali metal amalgam comprises a distributor and means for supplying said aqueous liquid under pressure to said distributor, said distributor being positioned to propel aqueous liquid upwardly through the column, together with hydrogen gas generated by the decomposition.

References Cited in the file of this patent

UNITED STATES PATENTS

| | | |
|---|---|---|
| 623,693 | Acker | Apr. 25, 1899 |
| 2,588,469 | Basilewsky | Mar. 11, 1952 |
| 2,698,779 | Adams et al. | Jan. 4, 1955 |
| 2,732,284 | Sakowski | Jan. 24, 1956 |
| 2,801,163 | Conforto | July 30, 1957 |
| 2,837,408 | Sakowski | June 3, 1958 |
| 2,872,291 | Crabbe et al. | Feb. 3, 1959 |